United States Patent
Kanai (10) Patent No.: US 6,738,867 B1
(45) Date of Patent: May 18, 2004

(54) DISK ARRAY SYSTEM READING AHEAD OPERAND DATA BACKGROUND OF THE INVENTION

(75) Inventor: Hiroki Kanai, Higashiyamato (JP)

(73) Assignee: Hitachi, Ltd., Tokyo (JP)

(*) Notice: Subject to any disclaimer, the term of this patent is extended or adjusted under 35 U.S.C. 154(b) by 656 days.

(21) Appl. No.: 09/585,330

(22) Filed: Jun. 2, 2000

(30) Foreign Application Priority Data

Jun. 2, 1999 (JP) .......................................... 11-154654

(51) Int. Cl.[7] .............................. G06F 12/00; G06F 9/30
(52) U.S. Cl. ...................... 711/137; 711/154; 712/207; 712/206
(58) Field of Search ................................ 711/154, 113, 711/118, 137; 712/207; 714/53; 365/189

(56) References Cited

U.S. PATENT DOCUMENTS

| 5,493,728 A | * | 2/1996 | Solton et al. ............... 711/113 |
| 5,721,865 A | | 2/1998 | Shintani et al. ............. 711/137 |
| 5,845,103 A | * | 12/1998 | Sodani et al. ............... 712/216 |
| 6,341,335 B1 | * | 1/2002 | Kanai et al. ................. 711/137 |
| 6,401,193 B1 | * | 6/2002 | Afsar et al. ................. 712/207 |

FOREIGN PATENT DOCUMENTS

| JP | 7271577 | 10/1995 |
| JP | 8194615 | 7/1996 |

* cited by examiner

Primary Examiner—Kevin L. Ellis
Assistant Examiner—Thang H To
(74) Attorney, Agent, or Firm—Antonelli, Terry, Stout & Kraus, LLP (57) ABSTRACT

A dedicated register is provided in an external access controller such that read ahead of operand data is performed. Using a store instruction, a program initiates read ahead by writing the read ahead address to the dedicated register. The read ahead controller stores read ahead data in the dedicated register. When the program issues a load instruction, the read ahead data is transmitted.

21 Claims, 9 Drawing Sheets

DISK ARRAY SYSTEM READING AHEAD OPERAND DATA BACKGROUND OF THE INVENTION

FIELD OF THE INVENTION

The present invention relates to an apparatus multiplexed processing of a plurality of requests where access patterns cannot be predicted, such as a disk array system, and especially relates to controlling of reading operand data to be accessed by a processor.

DESCRIPTION OF RELATED ART

A disk array system reads and stores data corresponding to a plurality of magnetic disk units (hereafter also referred to as hard disk drives). As for the disk array system, the processor usually performs data control and controls the entire system. As typified by the disk array system, a system with a processor uses it to execute a program stored in memory, or in other words, sequentially execute the instruction codes stored in memory. Operand data from memory or registers is used in arithmetic. Usually, the system comprises a processor that performs arithmetic, memory, a memory controller that controls the memory and a plurality of control LSIs.

Figure 9:
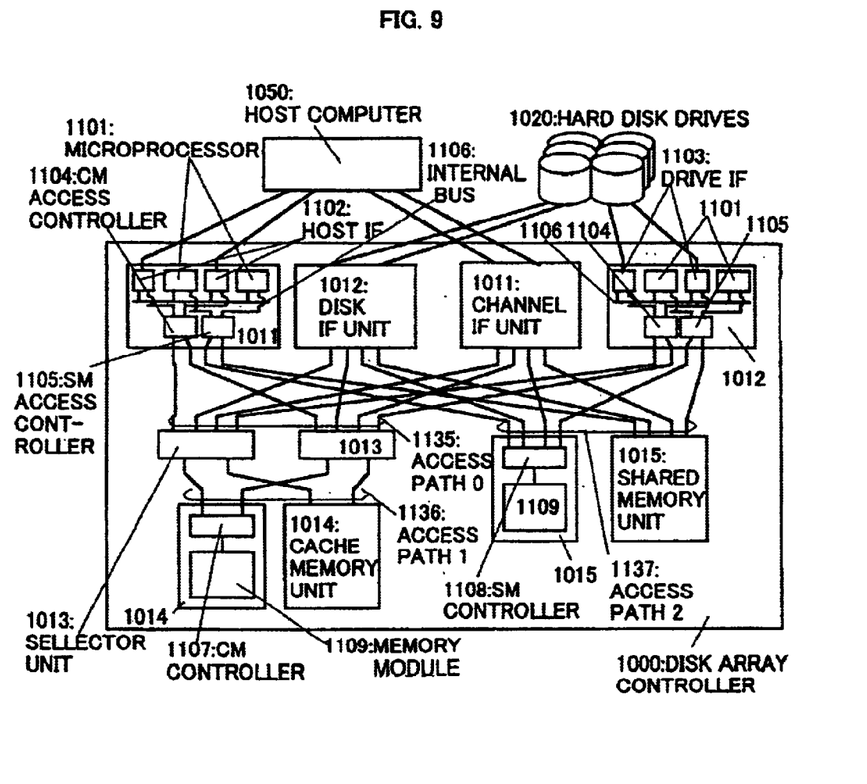
FIG. 9 is a block diagram indicating an example of the disk array system related to the present invention.

FIG. 9 is an example of a disk array system. Broadly speaking, a disk array system contains hard disk drives 1020 and a disk array controller 1000 that controls the hard disk drives. The hard disk drives 1020 and disk array controller 1000 are connected by drive IF 1103. Disk array controller 1000 and host computer 1050 are connected by host IF 1102. Disk array controller 1000 contains: channel IF unit 1011 that controls the connection to host computer 1050, disk IF unit 1012 that controls the connection to the hard disk drives, shared memory unit 1015 that contains all shared memory for the entire system, and cache memory unit 1014 that contains the cache memory. Channel IF unit 1011 and shared memory unit 1015 as well as disk IF unit 1012 and shared memory unit 1015 are connected by access path 2 1137. Channel IF unit 1011 and cache memory unit 1014 as well as disk IF unit 1012 and cache memory unit 1014 are connected by access path 0 1135 and access path 1 1136 via selector unit 1013. Channel IF unit 1011 is provided with host IF 1102, microprocessor 1101 (hereafter referred to as processor), SM access controller 1105, CM access controller 1104 and internal bus 1106 that connects them. Disk IF unit 1012 is provided drive IF 1103, processor 1101, SM access controller 1105, CM access controller 1106 and internal bus 1106 that connects them. The channel IF unit and cache memory unit contain CM controller 1107 that controls memory and memory module 1109. The shared memory unit contains SM controller 1108 that controls memory and memory module 1109. The processors in the channel IF unit and disk IF unit process data write and read instructions from the host while recognizing the state of the disk array system by accessing operand data in the memory of the shared memory unit or in the registers of each controller.

With this type of processor system, in addition to the computational performance of the processor, the performance of reading operand data from memory or registers into the processor is important. The delay from when the processor issues an access request until data is received is known as access latency. In recent years, the processor's core performance has improved, but there has not been much improvement in the performance of accessing and reading operand data that accompanies an external I/O access. Due to these differing performance characteristics, if access latency becomes an issue, the processor will stall, processor performance will deteriorate, and consequently the memory system will create a system-wide bottleneck.

Basically, there are two ways to enhance the operand data access performance. The first is to improve performance by reducing access time, and the second is to conceal the access time. However, in order to reduce the access time, it is necessary to increase the operating frequency of the access path. This results in package noise problems such as cross talk, and makes improvement difficult. Especially, with a disk array system as shown in FIG. 9, several LSIs lie between the processor and the operand data, and the system is constructed with a long distance between the processor and operand data. Consequently, it is difficult to reduce the access time below a specific value. The "read ahead" of data can be given as an example of the second method, to conceal the access time. One conventional example in which the processor uses a dedicated instruction for read ahead is the debt (Data Cache Block Touch) instruction of the PowerPC instruction set, listed in the "PowerPC Microprocessor Family Programming Environment." The debt instruction is a dedicated instruction that reads operand data into the processor's internal cache.

However, when using a dedicated instruction, because in some cases an external I/O access time on the order of microseconds is required with a large scale system such as aforementioned disk array system, it may be impossible to verify that the data is in the cache at the point in time when the data is actually required. Further, because some cache memories are occupied for a time on the "order of microseconds", the execution of a plurality of read ahead instructions will decrease the usage efficiency of the cache. With the PowerPC, the debt instruction is effective for the main memory, but cannot be executed for external I/O. In addition, the relatively inexpensive embedded-processors used for so-called embedded applications are not provided with this type of dedicated instruction.

SUMMARY OF THE INVENTION

As has been described above, with the increased speed of processors in recent years, the relative performance of operand access that accompanies an external I/O access, typically an access of external memory or external registers, has decreased. Consequently, this creates a bottleneck for system performance. In other words, the internal processing performance of a processor increases with increased operating frequency of the processor core unit, but on the other hand, the external I/O access speed is insufficient. Therefore, the performance of a system that issues a plurality of external I/O accesses, such as an embedded type system, depends upon the performance of the external I/O access.

The main problem the present invention intends to resolve is improvement of the operand access performance. Especially for external I/O control, the object is to inexpensively and easily realize improved operand data access performance of the processors.

One factor causing the aforementioned problems common to operand data access, is that for the operand access that accompanies conventional external I/O, there is no operation until after an external I/O request is generated. Improvement of the speed at which operand data is read requires reduction in the access latency, the time from when the processor issues a request to read from the memory or a register until there is a response, and external IF must be made high-speed. High-speed memory such as high-speed SRAM or dedicated memory for each processor, is expensive and therefore leads to higher priced systems. Further, it is difficult to achieve a large reduction in the operand access time.

Another problem due to increased access latency is as the occupancy percentage of the system bus increases, the effective performance of the system bus decreases.

In short, the present invention resolves the above problems by reading (hereafter referred to as reading ahead) operand data in advance from the memory or registers into a register within the external access controller, before operand data is required in the external access controller.

The specific is described below.

A read ahead controller is provided in the external access control LSI that controls external access of the processor.

The read ahead controller is provided with an access control circuit that controls read ahead by using a read ahead register circuit comprising: one or more pre-fetch register sets provided with an address register that specifies the memory or register address that will be pre-fetched, an address register valid flag that indicates validity of data in said address register, a data register that stores pre-fetched data, and a data register valid flag that indicates validity of data in said data register; and an address checker circuit that evaluates whether the address of the access destination matches the value in said address register.

The read ahead controller operates such that upon detecting a write access to the read ahead register, stores the data of said write access in the address register and sets the address register valid bit. Further, the controller performs a read access at the address indicated by the data stored in said address register, stores the read data in the data register and sets the data valid flag. In the case where the valid bit of said address register is set and a read access is detected at the address matching the data stored in said address register, if said data valid flag has already been set, the data stored in the data register is transmitted immediately. If said data valid flag has not been set, after said data valid flag is set, the data stored in said data register is transmitted, and said address valid flag and said data valid flag are reset.

If a write access occurs at the address stored in the address register of the read ahead register, the read ahead controller sets the data of said write access in the data register and sets the data register valid flag.

If the read ahead controller detects a write access to the read ahead register, and if all address register valid flags of the pre-fetch register set have been set, read ahead will not be performed.

DESCRIPTION OF THE PREFERRED EMBODIMENTS

Below, details of the present invention shall be described using figures.

First, we shall briefly discuss access by processor 1. The processor accesses memory and the registers via the processor local bus and an external access LSI. The processor performs all external accesses such as instruction code, data and external register accesses via the processor local bus. Therefore, the processor can only access one of several areas at any given time.

Figure 1:
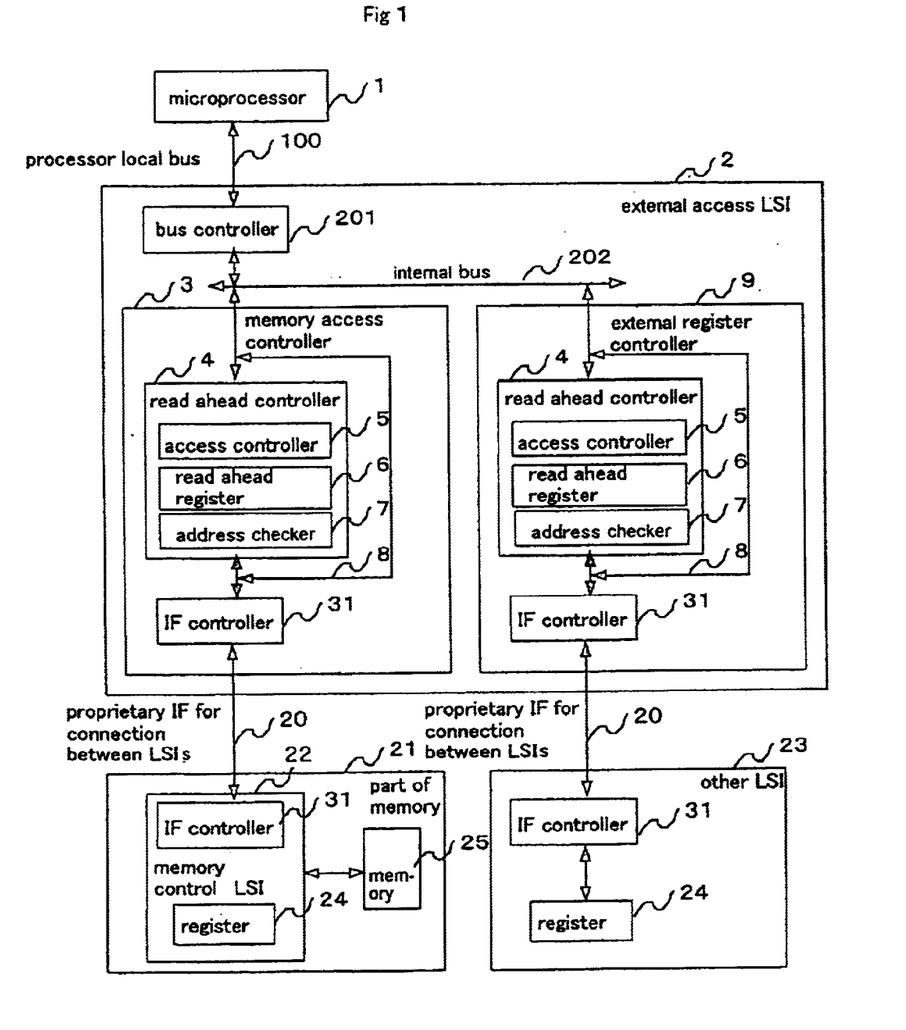
FIG. 1 an example block diagram indicating an overview of the external access controller related to the present invention.

FIG. 1 is an example block diagram indicating an overview of the present invention. This embodiment is an example of the case where external access is performed by reading ahead. The disk array controller shown in FIG. 1 basically comprises microprocessor 1, external access LSI 2, memory unit 21 and other LSI 23. Processor local bus 100 connects processor 1 with external access LSI 2. Proprietary IF for connection between LSIs 20 connects external access LSI 2 with memory unit 21 and with other LSI 23. Memory unit 21 comprises memory control LSI 22 that directly controls memory, and memory 25. Memory control LSI 22 is provided internally with IF controller 31 and register 24. The other LSI 23 is provided internally with IF controller 31 and register 24. External access LSI 2 is comprised of bus controller 201, memory access controller 3, external register controller 9, and internal bus 202 by which they are connected. Memory access controller 3 and external register controller 9 have the same internal configurations. Describing memory access controller 3 as an example, it comprises read ahead controller 4 which is provided with read ahead register 6 that stores the address at which read ahead is to be performed and the read ahead data, address checker 7 that compares the access destination address to the address of the data that was read ahead, and access controller 5 that processes the read ahead access and controls the read ahead register and the address checker, and IF controller 31. Details of read ahead controller 4 will be described using FIGS. 4, 5, and 6.

As described above, this embodiment is characterized as providing a dedicated register for the purpose of read ahead, such that the read ahead of operand data has been realized.

Next, using FIG. 2 and FIG. 3, the operation flow of the method to access operand data as related to the present invention will be described.

Figure 2:
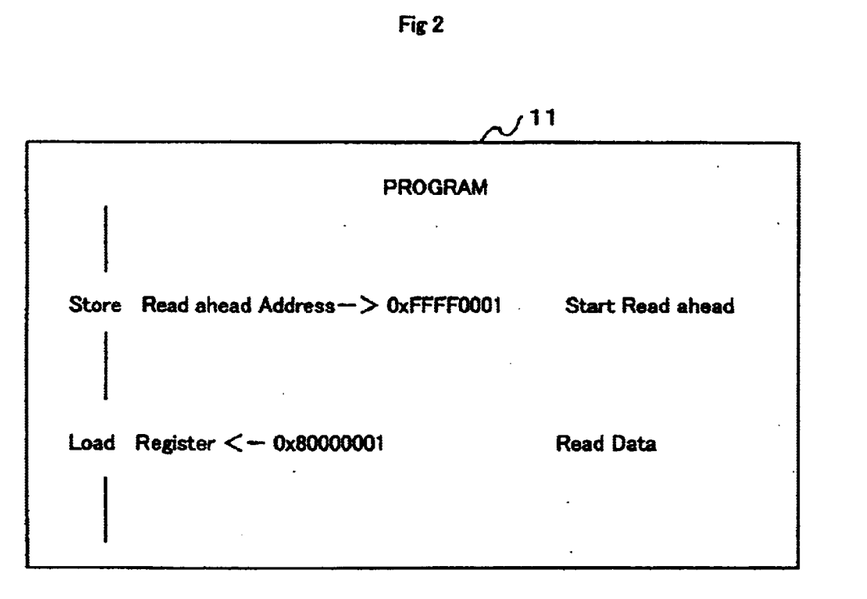
FIG. 2 is a list indicating an example program related to the present invention.

FIG. 2 is an example program related to the present invention. Preceding the read access of operand data that accompanies an external I/O access, program 11 activates the read ahead function by writing the address of said operand data to the read ahead register with a store instruction. Thereafter, when operand data becomes necessary, the program reads in the operand data with a load instruction.

This embodiment is characterized as performing read ahead of the operand data using the store instruction and load instruction provided on all processors. Therefore, since a dedicated instruction for read ahead is unnecessary, processors intended for inexpensive embedded applications can also realize read ahead of the operand data.

Figure 3:
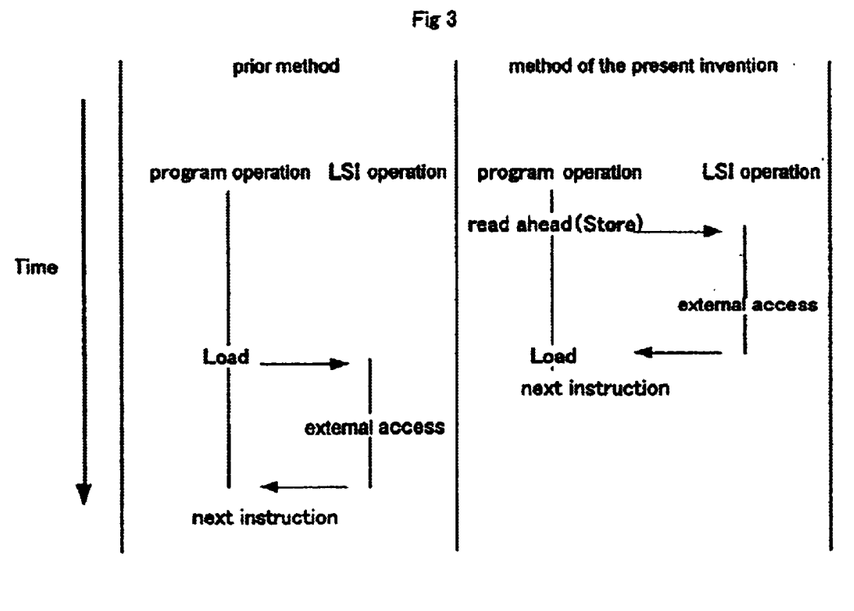
FIG. 3 is a flowchart indicating an example operation related to the present invention.

FIG. 3 is an operation flowchart comparing the prior method and the method of the present invention with regard to program operation and LSI operation. With the prior method, a load instruction was issued at the point in time when the operand data became required. Thereafter, to perform an external I/O access, the processor would stall until said operand data was actually read into the processor. On the other hand, with the present invention, read ahead is performed using a store instruction prior to the operand data becoming necessary. In this manner, the external control LSI reads operand data into the read ahead register. During the interval from when the read ahead is issued until the operand data is actually read, the processor can perform other processing. Duration of the store processing is at most several processor operating cycles. On the other hand, the read instruction depends upon the system configuration and its processing duration is on the order of several microseconds for a large-scale system. Therefore, in contrast to the conventional method that halts processing for an interval of several microseconds, with the present invention, other processing is performed so that the operand data access time can be concealed.

Figure 4:
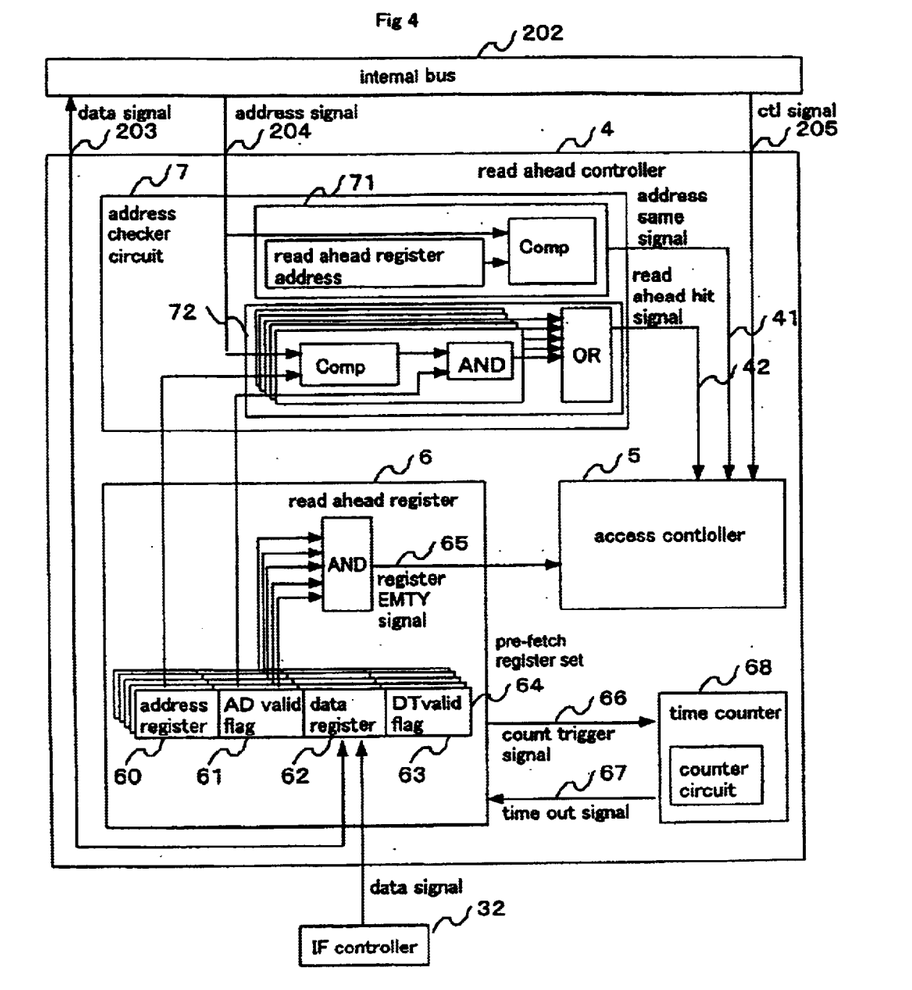
FIG. 4 is a block diagram indicating an example read ahead controller related to the present invention.
Figure 5:
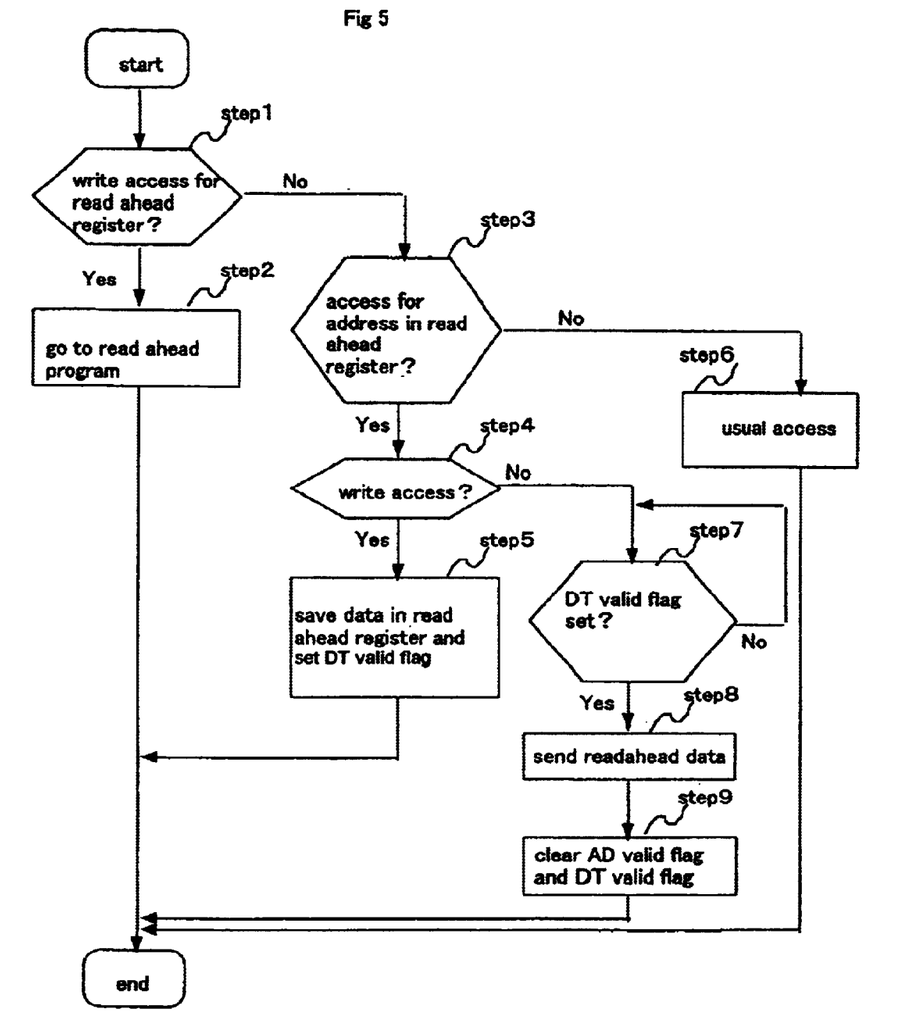
FIG. 5 is a flowchart indicating an example operation of the access controller inside the read ahead controller related to the present invention.

Next, an example realization of the read ahead controller will be described using FIG. 4, FIG. 5 and FIG. 6. FIG. 4 is a block diagram indicating an example of the read ahead controller shown in FIG. 1. Read ahead register 6 is provided with a plurality of pre-fetch register sets 64 comprised of an address register 60 that stores the address at which read ahead is to be performed, an AD valid flag 61 that indicates whether the data in said address register 60 is valid or invalid, a data register 62 that stores the operand data, and a DT valid flag 63 that indicates whether the data in said data register 62 is valid or invalid. Register EMTY signal 65 is provided to indicate whether there is space in the register set, based on the logical AND of the AD valid flags of all register sets. Address checker circuit 7 is provided with access address checker circuit 71 and read ahead address checker circuit 72. Access address checker circuit 71 is provided with a comparator that evaluates whether the address accessed by the processor is the access corresponding to the read ahead register, and generates address same signal 41 to report the evaluated results. Read ahead address checker circuit 72 is provided with a comparator that compares the address accessed by the processor to the read ahead address stored in read ahead register 6, and generates a signal that indicates whether the addresses match, based on the logical AND of the comparator result and AD valid flag. The number of comparators provided is the same as the number of pre-fetch register sets. Read ahead hit signal 42 that indicates whether the address requested by the processor is in the read ahead register is generated based on the logical OR of the signals from each comparator.

This preferred embodiment is provided with time counter 68 to manage the pre-fetch register sets. Time counter 68 is provided with a counter circuit for measuring time. Counting is started by count trigger signal 66 that indicates the start of the read ahead operation. If the time out value that has been set in advance is exceeded, time out signal 67 is issued. By clearing AD valid flag 61 and DT valid flag 63 of the corresponding pre-fetch register set with the time out signal, read ahead register 6 halts the read ahead processing and releases pre-fetch register set 64.

Next, the operation of access controller 5 will be described. FIG. 5 and FIG. 6 are flowcharts indicating the operation of access controller 5. From the flowcharts indicated in FIG. 5 and FIG. 6, access controller 5 can be easily realized with a sequencer. FIG. 5 shows the flow of control when an access request is issued from the processor. The access request from the processor can be recognized by decoding the control signal. When an access request is issued, the first step (step 1) is to evaluate from the states of the address same signal and the internal bus control signal whether said access is a write access for the read ahead register. In the case of a write access for the read ahead register, the read ahead routine is activated and completed (step 2). Details of the read ahead routine will be described later using FIG. 6. In the case of no write access for the read ahead register, the state of the read ahead hit signal is evaluated to determine whether the access is for the address specified in the read ahead register (step 3). If the access is for the address set in the read ahead register, this indicates that the read ahead has been already activated. In this case, the access is evaluated as to whether it is a write access (step 4). If the access is a write access, data is stored in the read ahead data register and the DT valid flag is set (step 5). Therefore, after read ahead is activated, if a write access is issued for the same address, the write data becomes valid and a data mismatch will not occur. After step 5, said access is completed. On the other hand, if at step 3, the access is not for the address set in the read ahead register, it is a usual access and unrelated to the read ahead process. As such, a usual I/O access is performed (step 6) and completed. If at step 4, the access is not a write access, or in other words, if it is a read access, this indicates a read access for the read ahead address. In this case, it is verified whether the DT valid flag is set, and if not set, the access controller waits until the flag is set (step 7). If the DT valid flag is set, since this indicates that read ahead data is stored in the data register, said read ahead data is sent to the processor (step 8). Finally, the AD valid flag and DT valid flag are cleared and access is completed (step 9). With the above control, if read ahead data has been stored, the read ahead data can be sent to the processor.

Figure 6:
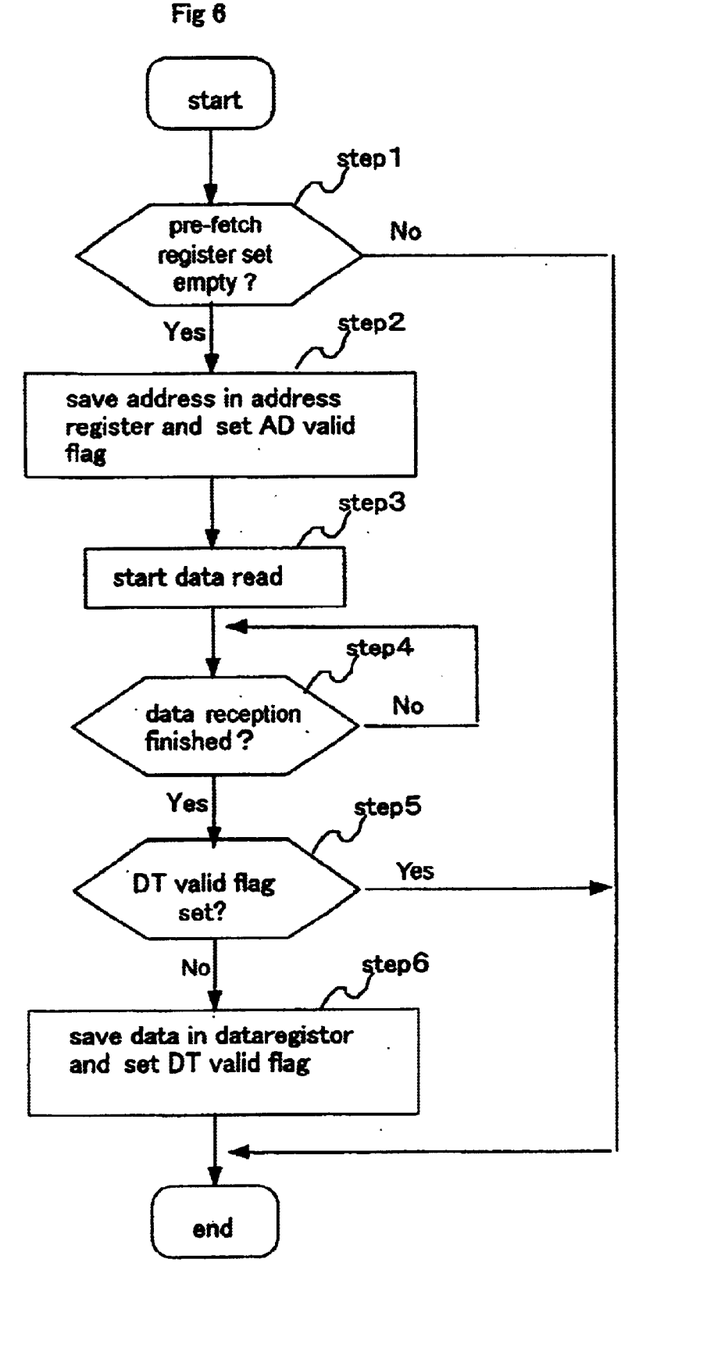
FIG. 6 is a flowchart indicating an example operation of the access controller inside the read ahead controller related to the present invention.

FIG. 6 indicates the flow of control when read ahead is activated. When read ahead is activated at step 2 of FIG. 5, the first step (step I) is to evaluate whether there is an empty register set in the read ahead register. If there is an empty register set, the address is stored in the address register and the AD valid flag is set (step 2). Next, the actual data read is started (step 3), and the routine waits until data reception is complete (step 4). After data reception is complete, the DT valid flag is evaluated as to whether it has been set (step 5). If the DT valid flag has not been set, the received read data is stored in the data register, the DT valid flag is set (step 6), and the routine is completed. If at step 5, the DT valid flag has been set, this indicates that a write access has been issued for the same address during the read ahead access; the received data is discarded and the processing is completed. Moreover, at step 1, if the pre-fetch register set is not empty, read ahead is not processed and the routine is completed.

Figure 7:
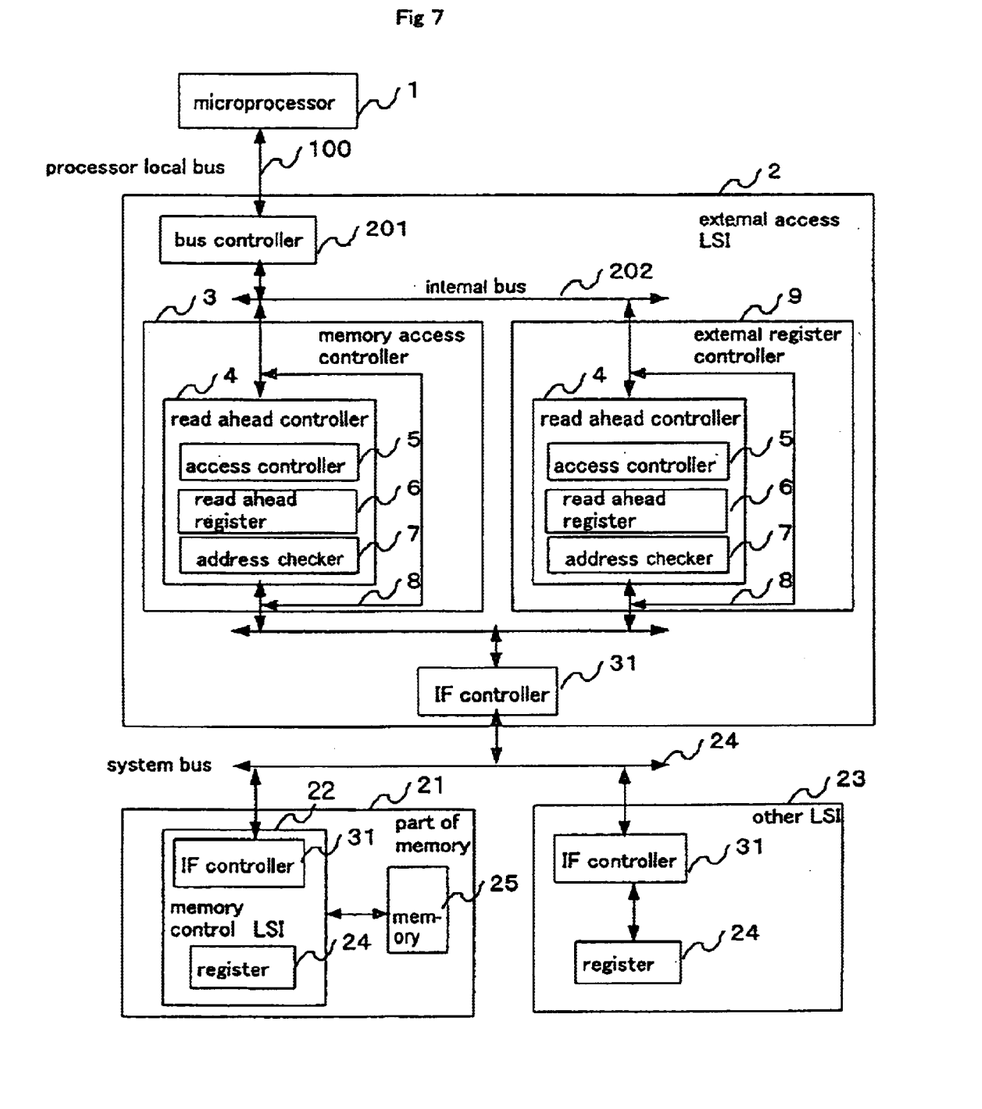
FIG. 7 is an example block diagram indicating an overview of the external access controller related to the present invention.

FIG. 7 is a block diagram indicating another example of a disk array controller related to the present invention. This preferred embodiment is characterized by the connection of external access LSI 2 to memory control LSI 22 and other LSI 23 with system bus 24. Because the LSIs are connected with a bus, systemization is easy when configuring a small-scale system.

Figure 8:
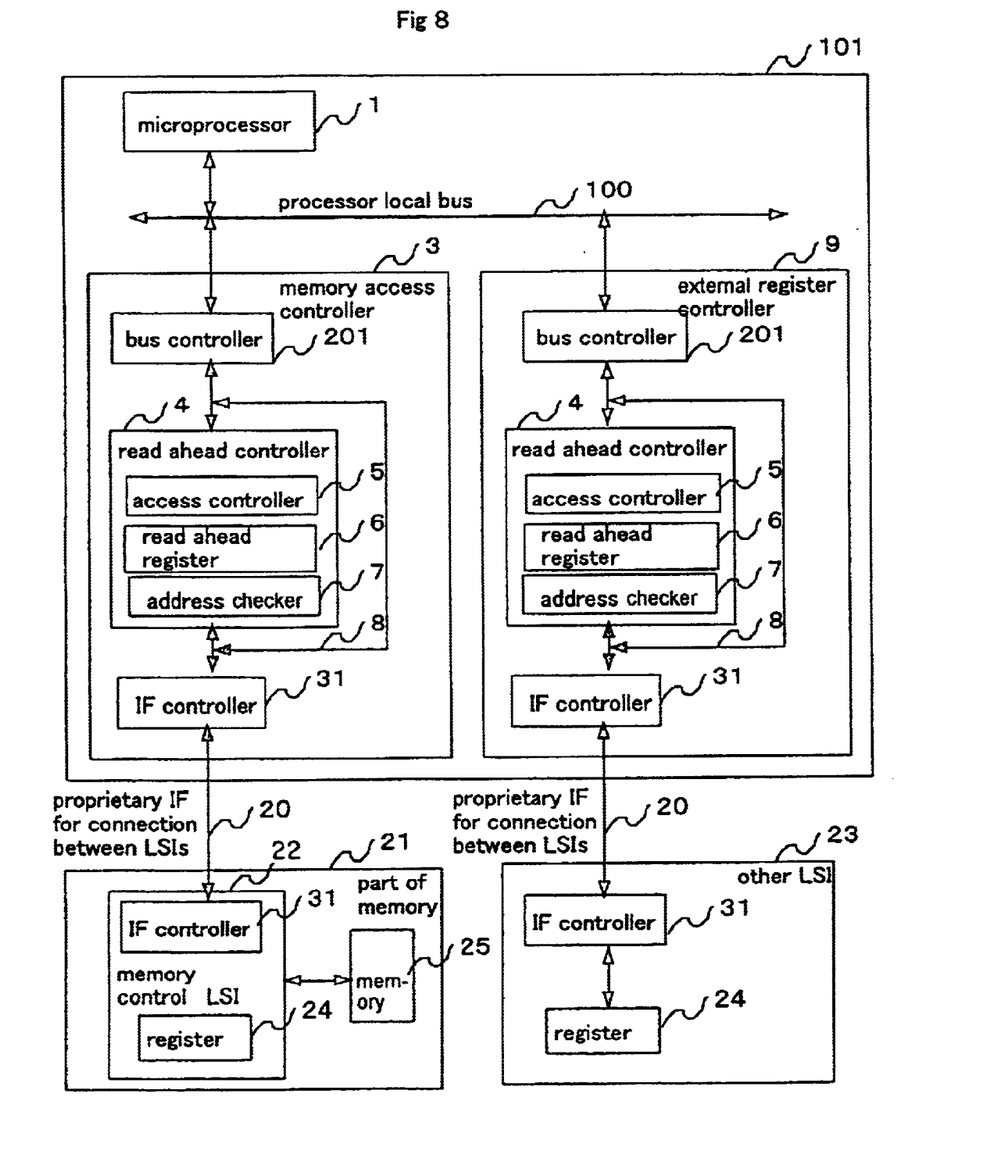
FIG. 8 is an example block diagram indicating an overview of the external access controller related to the present invention.

FIG. 8 is a block diagram indicating another example of a disk array controller related to the present invention. The present invention is characterized with microprocessor 1, memory access controller 3 equipped with read ahead controller 4, or external register controller 9 equipped with read ahead controller 4, being packaged within the same LSI package. Since the frequency of the processor local bus can be increased, an access time from the processor to the read ahead register can be reduced.

Briefly describing, because operand data from memory and registers are read into an internal register of the external access controller, in advance, and prior to the operand data being required in the external access controller, the present invention is effective in increasing the performance of the processor by concealing the operand data access time that accompanies an external access and reducing processor stalling. The specific effectiveness is described below.

The external access controller that controls external access of the processor is provided with a read ahead controller. Because the read ahead controller is provided with: a read ahead register circuit equipped with one or more pre-fetch register sets comprised of an address register that specifies the address of the memory or register at which read ahead is to be performed, an address register valid flag that indicates the validity of the data in said address register, a data register that stores read ahead data, and a data register valid flag that indicates the validity of the data in said data register; an address checker circuit that evaluates whether the address of the access destination matches the value of said address register; and an access control circuit that uses said read ahead register circuit and said address checker circuit to control read ahead; the result is that read ahead can be directed with the processor's store instruction.

If a write access occurs at the address stored in the address register of the read ahead register, the read ahead controller stores the data of said write access into the data register and sets the data register valid flag. As a result, data will be consistent, even if a write has occurred at the address specified by the read ahead.

If the read ahead controller detects a write access for the read ahead register, and if all address register valid flags are set in the pre-fetch register sets, read ahead is not performed. Therefore, as a result, management of the pre-fetch register sets can be easily realized.

What is claimed is:

1. A data processing system comprising:
   a processing unit for executing instruction codes;
   a memory for storing operand data associated with the instruction codes;
   a register for storing operand data with the instruction codes; and
   a read ahead control unit connected to the processing unit, the memory and the register, for reading, in advance, operand data from the memory and the register in response to a store instruction from the processing unit and before loading the operand data to the processing unit from the memory and the register in response to a load instruction from the processing unit,
   wherein the processing unit, prior to issuing the load instruction, executes other instruction codes while said read ahead control unit reads the operand data from the memory and the register.

2. A data processing system according to claim 1, wherein the read ahead control unit further comprises:
   a read ahead controller for the memory which reads, in advance, operand data from the memory before the load instruction to load the operand data read from the memory is issued, and
   a read ahead controller for the register which reads, in advance, the operand data from the register before the load instruction to load the operand data read from the register is issued.

3. A data processing system according to claim 2, further comprising:
   a first dedicated bus connecting the read ahead controller for the memory and the memory, and
   a second dedicated bus connecting the read ahead controller for the register and the register.

4. A data processing system according to claim 1, wherein both the processing unit and the read ahead control unit are packaged in a LSI package.

5. A data processing system according to claim 1, wherein the read ahead control unit comprises:
   an address register that designates an address of the memory or the register
   at which read ahead is to be performed, and
   a data register that stores operand data read, in advance, from the memory and the register.

6. A data processing system according to claim 5, wherein the said read ahead control unit further comprises:
   an address register valid flag that indicates validity of the address that the address register designates, and
   a data register valid flag that indicates validity of the operand data stored in the data register, and
   wherein the read ahead control unit writes operand data read from the memory and the register when the data register validity flag is set, and the read ahead control unit does not write operand data read from the memory and the register when the data register validity flag is not set.

7. A data processing system according to claim 6, further comprising.
   a counter circuit for measuring time while the address register valid flag is set, and
   wherein when the address register valid flag is set for a time larger than predetermined time out value, both the address register valid flag and the data register valid flag are reset.

8. A data processing system comprising:
   a processing unit for executing a program;
   a memory for storing operand data associated with the program;
   a register for storing operand data associated with the program; and
   a memory access control unit connected to the processing unit, the memory and the register via a bus, for reading the operand data from the memory and the register in response to a store instruction from the processing unit and before the program requests the operand data from the memory and the register,
   wherein the processing unit, prior to requesting the operand data, continues execution of the program while said memory access control unit reads the operand data from the memory and the register.

9. A data processing system according to claim 8, wherein the memory access control unit further comprises:
   a memory access controller for the memory which reads, in advance, operand data from the memory before the program requests the operand data read from the memory, and a memory access controller for the register which reads, in advance, operand data from the register before the program requests the operand data read from the register.

10. A data processing system according to claim 8, further comprising:
   a first dedicated bus connecting the memory access controller for the memory and the memory, and
   a second dedicated bus connecting the memory access controller for the register and the register.

11. A data processing system according to claim 8, wherein both the processing unit and the memory access control unit are packaged in a LSI package.

12. A data processing system according to claim 8, wherein the memory access control unit comprises:
   an address register that designates an address of the memory or the register at which read ahead is to be performed, and
   a data register that stores operand data read, in advance, from the memory and the register.

13. A data processing system according to claim 12, wherein the said read ahead control unit further comprises:
   an address register valid flag that indicates validity of the address that the address register designates, and
   a data register valid flag that indicates validity of the operand data stored in the data register, and
   wherein the memory access control unit writes operand data read from the memory and the register when the data register validity flag is set, and the memory access control unit does not write operand data read from the memory and the register when the data register validity flag is not set.

14. A data processing system according to claim 13, further comprising a counter circuit for measuring time while the address register valid flag is set, and
   wherein when the address register valid flag is set for a time larger than predetermined time out value, both the address register valid flag and the data register valid flag are reset.

15. A memory access controller comprising:
   a bus controller for controlling an external bus for connecting to a processing unit which executes instruction codes;
   an interface unit for connecting an external memory and an external register, both the external memory and the external register storing operand data associated with the instruction codes; and
   a read ahead control unit connected to the bus controller and the interface unit, for reading, in advance, operand data from the external memory and the external register in response to a store instruction from the processing unit and before loading the operand data to the processing unit from the external memory and the external register in response to a load instruction from the processing unit,
   wherein the processing unit, prior to issuing the load instruction, executes other instruction codes while said read ahead control unit reads the operand data from the external memory and the external register.

16. A memory access controller according to claim 15, wherein the read ahead control unit further comprises:
   a read ahead controller for the external memory which reads, in advance, operand data from the external memory before the load instruction to load the operand data read from the external memory is issued, and
   a read ahead controller for the external register which reads, in advance, the operand data from the external register before instruction to load the operand data read from the external register is issued.

17. A memory access controller comprising:
   a bus controller for controlling an external bus for connecting to a processing unit which executes a program;
   an interface unit for connecting an external memory and an external register, both the external memory and the external register storing operand data associated with the instruction codes; and
   a read ahead control unit connected to the bus controller and the interface unit, for reading, in advance, operand data from the external memory and the external register in response to a store instruction from the processing unit and before the program requests the operand data from the external memory and the external register,
   wherein the processing unit, prior to requesting the operand data, continues execution while said read ahead control unit reads the operand data from the external memory and the external register.

18. A memory access controller according to claim 17, wherein the read ahead control unit further comprises:
   a read ahead controller for the external memory which reads, in advance, operand data from the external memory before the program requests the operand data read from the external memory, and
   a read ahead controller for the external register which reads, in advance, operand data from the external register before the program requests the operand data read from the external register.

19. A data processing system comprising:
   a processing unit for executing instruction codes;
   an interface unit for connecting an external memory and an external register, both the external memory and the external register storing operand data associated with the instruction codes; and
   a read ahead control unit connected to the bus controller and the interface unit, for reading, in advance, operand data from the external memory and the external register in response to a store instruction from the processing unit and before loading the operand data to the processing unit from the external memory and the external register in response to a load instruction from the processing unit,
   wherein the processing unit, prior to issuing the load instruction, executes other instruction codes while said read ahead control unit reads the operand data from the external memory and the external register.

20. A memory access controller comprising:
   a processing unit for executing a program;
   an interface unit for connecting an external memory and an external register, both the external memory and the external register storing operand data associated with the instruction codes; and
   a read ahead control unit connected to the bus controller and the interface unit, for reading, in advance, operand data from the external memory and the external register in response to a store instruction from the processing unit and before the program requests the operand data from the external memory and the external register,
   wherein the processing unit, prior to requesting the operand data, continues execution while said read ahead control unit reads the operand data from the external memory and the external register.

21. A memory access control method of controlling memory access from a processor to a memory and a register, comprising the steps of:

reading, in advance, operand data from the external memory and the external register in response to a store instruction from the processor and before loading the operand data to the processor from the memory and the register in response to a load instruction from the processor, wherein the processor, prior to issuing the load instruction, executes other instruction codes while reading the operand data from the external memory and the external register, storing the operand data into internal registers, and transferring the operand data to the processor when the load instruction is issued.

* * * * *